United States Patent
Myers et al.

(10) Patent No.: US 11,695,448 B2
(45) Date of Patent: Jul. 4, 2023

(54) FUEL DISPENSER ANTI-SKIMMING INPUT DEVICE

(71) Applicant: Gilbarco Inc., Greensboro, NC (US)

(72) Inventors: Howard Myers, Greensboro, NC (US); Giovanni Carapelli, High Point, NC (US)

(73) Assignee: Gilbarco Inc., Greensboro, NC (US)

( * ) Notice: Subject to any disclaimer, the term of this patent is extended or adjusted under 35 U.S.C. 154(b) by 86 days.

(21) Appl. No.: 14/813,546

(22) Filed: Jul. 30, 2015

(65) Prior Publication Data
US 2016/0034899 A1 Feb. 4, 2016

Related U.S. Application Data

(60) Provisional application No. 62/031,676, filed on Jul. 31, 2014.

(51) Int. Cl.
*H04B 5/00* (2006.01)
*G07F 7/08* (2006.01)
*G07F 13/02* (2006.01)

(52) U.S. Cl.
CPC ............ *H04B 5/0031* (2013.01); *G07F 7/088* (2013.01); *H04B 5/0081* (2013.01); *G07F 13/025* (2013.01)

(58) Field of Classification Search
CPC ..... H04B 5/0031; H04B 5/0081; G07F 7/088; G07F 13/025
(Continued)

(56) References Cited

U.S. PATENT DOCUMENTS 4,932,356 A * 6/1990 Watanabe .......... G03G 15/0849
399/30
4,977,528 A 12/1990 Norris
(Continued)

FOREIGN PATENT DOCUMENTS

EP  2393070 A1  12/2011
GB  2422705 A   8/2006
(Continued)

OTHER PUBLICATIONS

Texas Instruments, LDC1000 Inductance to Digital Converter, Data Sheet, Dec. 2013.
(Continued)

*Primary Examiner* — Mohammad A. Nilforoush
*Assistant Examiner* — Wodajo Getachew
(74) *Attorney, Agent, or Firm* — Nelson Mullins Riley & Scarborough LLP

(57) ABSTRACT

Systems and methods for detecting fraud. One method includes providing an input device, the input device having processing circuitry, a memory, and at least one information receiving module for receiving information associated with a user of the input device. The method also includes providing a sensor in electronic communication with the processing circuitry. The sensor has a sensor coil, and the sensor coil is disposed proximate the at least one information receiving module. Further, the method includes flowing alternating electrical current through the sensor coil to generate a magnetic field, measuring at least one electrical characteristic of the sensor, and providing first information representative of the at least one electrical characteristic to the processing circuitry. Finally, the method includes storing in the memory second information representative of at least one predetermined value of the at least one electrical char-
(Continued)

acteristic and comparing the first information with the second information.

9 Claims, 9 Drawing Sheets

(58) Field of Classification Search
USPC .......................................................... 705/50
See application file for complete search history.

(56) References Cited

U.S. PATENT DOCUMENTS

| | | | |
|---|---|---|---|
| 5,319,545 A | | 6/1994 | McGarvey et al. |
| 5,400,253 A | | 3/1995 | O'Connor |
| 5,423,457 A | | 6/1995 | Nicholas et al. |
| 5,671,254 A | * | 9/1997 | Nagata ................ H04L 27/2332 |
| | | | 375/364 |
| 5,689,071 A | | 11/1997 | Ruffner et al. |
| 5,734,851 A | | 3/1998 | Leatherman et al. |
| 5,956,259 A | | 9/1999 | Hartsell, Jr. et al. |
| 6,052,629 A | | 4/2000 | Leatherman et al. |
| 6,435,204 B2 | | 8/2002 | White et al. |
| 6,571,151 B1 | | 5/2003 | Leatherman |
| 6,830,182 B2 | | 12/2004 | Izuyama |
| 6,853,093 B2 | | 2/2005 | Cohen et al. |
| 6,935,191 B2 | | 8/2005 | Olivier et al. |
| 7,151,451 B2 | | 12/2006 | Meskens et al. |
| 7,289,877 B2 | | 10/2007 | Wilson |
| 7,703,676 B2 | | 4/2010 | Hart et al. |
| 7,780,083 B2 | | 8/2010 | Schliebe et al. |
| 8,132,721 B2 | | 3/2012 | Carapelli |
| 8,397,991 B2 | | 3/2013 | Mueller |
| 8,433,441 B2 | | 4/2013 | Oldham |
| 8,556,168 B1 | | 10/2013 | Lewis et al. |
| 8,708,235 B2 | | 4/2014 | Ozawa et al. |
| 8,757,010 B2 | | 6/2014 | Williams et al. |
| 2008/0041934 A1 | * | 2/2008 | Jenkins ................... G06Q 40/00 |
| | | | 235/379 |
| 2011/0303745 A1 | | 12/2011 | Jenkins et al. |
| 2013/0140364 A1 | | 6/2013 | McJones et al. |
| 2013/0334311 A1 | * | 12/2013 | Pant ..................... G11B 5/3954 |
| | | | 235/449 |
| 2014/0158768 A1 | * | 6/2014 | Ray ......................... H04K 3/825 |
| | | | 235/449 |

FOREIGN PATENT DOCUMENTS

| | | |
|---|---|---|
| GB | 2446425 A | 8/2008 |
| WO | 2012/154937 | 11/2012 |
| WO | 2013/149310 | 10/2013 |

OTHER PUBLICATIONS

International Search Report and Written Opinion for corresponding application No. PCT/US2015/043211, dated Oct. 23, 2015.

* cited by examiner

FUEL DISPENSER ANTI-SKIMMING INPUT DEVICE

PRIORITY CLAIM

This application claims the benefit of U.S. Provisional Application Ser. No. 62/031,676, titled "Fuel Dispenser Anti-Skimming Input Device," filed Jul. 31, 2014, which is hereby relied upon and incorporated herein by reference for all purposes.

FIELD OF THE INVENTION

Embodiments of the present invention relate generally to fuel dispenser and other retail payment systems. More particularly, embodiments of the invention relate to systems and methods for detecting and preventing fraud caused by skimming devices associated with various payment system input devices.

BACKGROUND

By way of background, payment systems have been incorporated into fueling sites in order to allow a customer to pay for fuel and other goods and services (such as a car wash, fast food, or convenience store products) using a credit or debit card. Such payment systems comprise various input devices, such as card readers and PIN pads, which are configured to accept data necessary to process the payment. The customer may provide certain payment data by presenting a payment card bearing a magnetic stripe or chip to a payment card reader. Data stored on the payment card may include one or more of the following: a Primary Account Number (PAN), the cardholder's name, a service code, and the card's expiration date. Also, if required to complete the transaction, the customer may enter account information such as a personal identification number (PIN) using a PIN entry device (e.g., a PIN pad). The system communicates the data to a remote host system responsible for the customer's account for verification.

Fraud poses continuing challenges to customers, merchants, and banks, among others. One example of such fraud is known as "skimming," which generally refers to any unauthorized attempt to acquire data associated with a transaction at an input device. Such data can include credit or debit card numbers, PINs, or other account information. Those of skill in the art are familiar with examples of techniques used to "skim" transaction data, which often involve the placement of an inconspicuous device capable of capturing data in the vicinity of an input device. For instance, fraudsters may overlay a data capture device resembling a card reader or keypad on the actual card reader or keypad so that, when a user completes a transaction, the overlaid device simultaneously captures the user's account information. In some cases, the data capture device also transmits the captured data to the fraudsters. To further avoid detection, skimmers have also placed data-capture devices within an input device or behind a bezel or fascia in which an input device is mounted. In other cases, fraudsters have installed small, unobtrusive cameras in the vicinity of a PIN pads to capture PINs. Additional information regarding "skimming" fraud is provided in commonly-assigned U.S. Pat. No. 8,132,721, the entire disclosure of which is incorporated by reference herein for all purposes.

Attempts have been made to combat fraud caused by skimming. Known methods include ultrasonic monitoring of an area in front of a card reader or for changes in "acoustic impedance." Other methods include narrowband monitoring for electrical emissions and attempts at electronic "jamming" of a skimming device overlaid on an input device. As those of skill in the art are aware, however, these methods suffer from a variety of drawbacks. With the ultrasonic monitoring method, for example, temperature and humidity compensation can complicate attempts to detect a change in "acoustic impedance" in the area surrounding the mouth of a payment card reader. Further, ultrasonic monitoring of the area in front of the card reader has limited resolution, it cannot monitor the card reader interior, and the potential locations of ultrasonic transceivers are constrained by the layout of the card reader bezel.

SUMMARY

The present invention recognizes and addresses disadvantages of prior art constructions and methods. According to one embodiment, the present invention provides a system for detecting fraud. The system comprises an input device comprising processing circuitry, a memory, and at least one information receiving module for receiving information associated with a user of the input device. The system also comprises a sensor in electronic communication with the processing circuitry. The sensor comprises at least one sensor coil. The at least one sensor coil is disposed proximate the at least one information receiving module. In addition, the system comprises a magnetic field generated at the at least one sensor coil. The processing circuitry is operative to receive information representative of at least one electrical characteristic of the at least one sensor coil, and the memory has stored therein information representative of a predetermined value of the at least one electrical characteristic.

According to a further embodiment, the present invention provides a method of detecting fraud associated with an input device. The method comprises the step of providing an input device, the input device comprising processing circuitry, a memory, and at least one information receiving module for receiving information associated with a user of the input device. Also, the method comprises providing a sensor in electronic communication with the processing circuitry. The sensor comprises at least one sensor coil, and the at least one sensor coil is disposed proximate the at least one information receiving module. Further, the method comprises flowing alternating electrical current through the at least one sensor coil to generate a magnetic field, measuring at least one electrical characteristic of the sensor, and providing first information representative of the at least one electrical characteristic to the processing circuitry. Finally, the method comprises storing in the memory second information representative of at least one predetermined value of the at least one electrical characteristic and comparing the first information with the second information.

According to yet another embodiment, the present invention provides a method of detecting fraud associated with an input device. The method comprises the step of providing an input device, the input device comprising processing circuitry, a memory, and at least one information receiving module for receiving information associated with a user of the input device. Also, the method comprises providing a sensor in electronic communication with the processing circuitry, the sensor comprising at least one coil. Further, the method comprises causing an alternating electrical current to flow through the at least one coil, measuring losses at the at least one sensor, and providing first information representative of the detected losses to the processing circuitry.

Finally, the method comprises comparing the first information with information stored in the memory regarding an expected value of losses detected at the at least one sensor.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
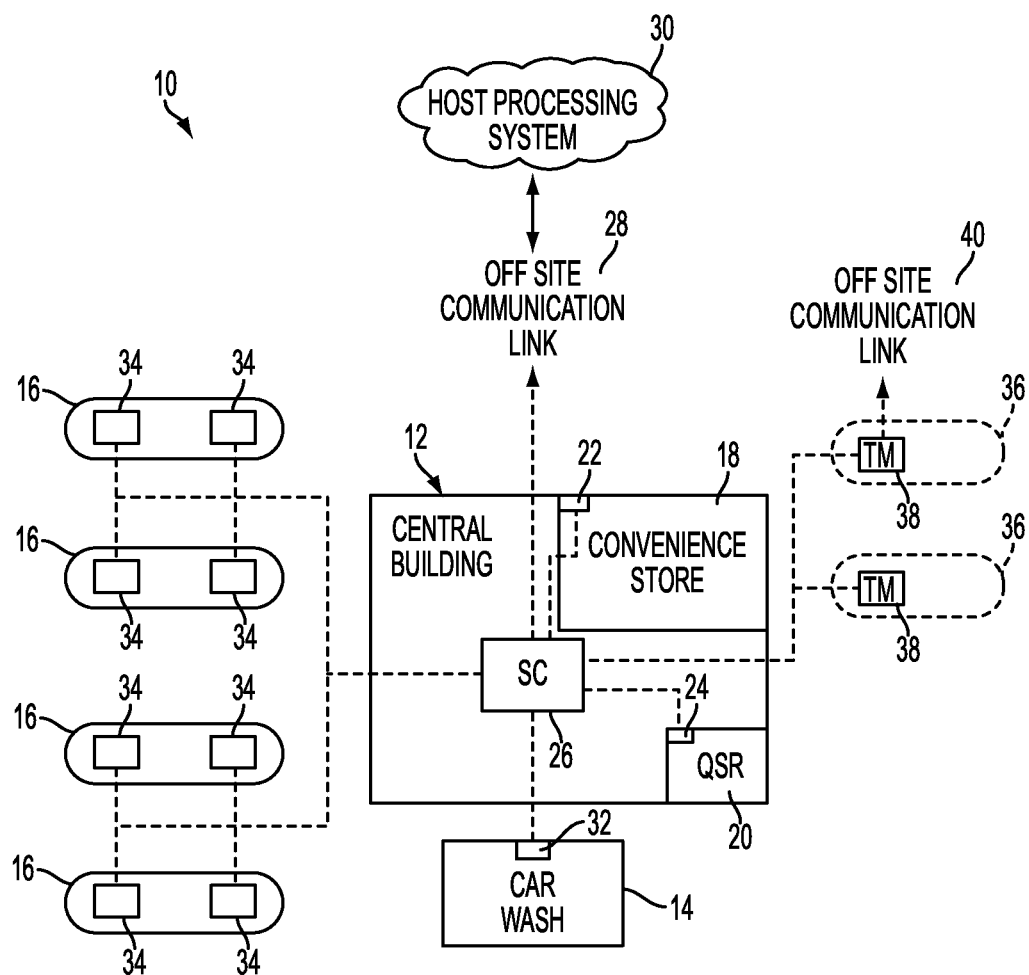
FIG. 1 is a diagrammatic representation of a retail fuel dispensing environment in which an embodiment of the present invention may be utilized.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention provide systems and methods which may be used to detect fraud caused by skimming associated with one or more input devices. As used herein, the term "input device" broadly refers to devices, including but not limited to encrypting PIN pads, keypads, touchscreens, secure card readers, and smartcard readers, which are capable of receiving information associated with a user of the input device. Such information may include information associated with a payment card, such as a PAN or other account number, the user's name, a service code, and the card's expiration date. Further, such information can include data associated with payment devices processed on-site or in a private retailer's network, such as data from loyalty or program-specific cards.

In some embodiments, an input device in accordance with the present invention may comprise a secure area. The secure area may be a tamper-protected physical enclosure for components of the input device which carry sensitive information, such as encryption keys or customer account numbers. Thus, the secure area may be protected by one or more tamper-responsive conductor circuits and/or encased in epoxy or the like. Background information regarding secure areas for electronic components of an input device is found in U.S. Pat. No. 6,853,093 to Cohen et al., the entire disclosure of which is incorporated herein by reference for all purposes.

Some embodiments of the present invention are particularly suitable for use with input devices in a retail service station environment, and the below discussion will describe preferred embodiments in that context. However, those of skill in the art will understand that the present invention is not so limited. In fact, it is contemplated that the present invention be used with any appropriate transaction environment. Additionally, it is contemplated that the present invention be used with any suitable input device which receives information that requires protection from skimming.

Referring now to FIG. 1, an exemplary fueling environment 10 may comprise a central building 12, a car wash 14, and a plurality of fueling islands 16. The central building 12 need not be centrally located within the fueling environment 10, but rather is the focus of the fueling environment 10, and may house a convenience store 18 and/or a quick serve restaurant 20 therein. Both the convenience store 18 and the quick serve restaurant 20 may include a point of sale (POS) 22, 24, respectively. POS 22, 24 may comprise a single computer or server operatively connected to an associated card reader and payment terminal. Additionally, POS 22, 24 may include a display, a touch screen, and/or other input devices.

The central building 12 may further house a site controller (SC) 26, which in an exemplary embodiment may be the PASSPORT® POS system, sold by Gilbarco Inc. of Greensboro, N.C., although third party site controllers may be used. Site controller 26 may control the authorization of fueling transactions and other conventional activities as is well understood, and site controller 26 may preferably be in operative communication with each POS. Alternatively, site controller 26 may be incorporated into a POS, such as point of sale 22 if needed or desired.

Further, site controller 26 may have an off-site communication link 28 allowing communication with a remote host processing system 30 for credit/debit card authorization, content provision, reporting purposes or the like, as needed or desired. In one embodiment, communication link 28 may be a stand alone router, switch, or gateway, although it should be appreciated that site controller 26 may additionally perform the functions of, and therefore replace, such a device. The off-site communication link 28 may be routed through the Public Switched Telephone Network (PSTN), the Internet, both, or the like, as needed or desired. Remote host processing system 30 may comprise at least one server maintained by a third party, such as a financial institution. Although only one remote host processing system 30 is illustrated, those of skill in the art will appreciate that in a retail payment system allowing payment via payment devices issued by multiple payment card companies or financial institutions, site controller 26 may be in communication with a plurality of remote host processing systems 30.

Car wash 14 may have a POS 32 associated therewith that communicates with site controller 26 for inventory and/or sales purposes. Car wash 14 alternatively may be a stand alone unit. Note that car wash 14, convenience store 18, and quick serve restaurant 20 are all optional and need not be present in a given fueling environment.

Fueling islands 16 may have one or more fuel dispensers 34 positioned thereon. Fuel dispensers 34 may be, for example, the ENCORE® fuel dispenser sold by Gilbarco Inc. of Greensboro, N.C. Fuel dispensers 34 are in electronic communication with site controller 26 through any suitable link, such as two wire, RS 422, Ethernet, wireless, etc. if needed or desired.

Fueling environment 10 also has one or more underground storage tanks (USTs) 36 adapted to hold fuel therein. As such, USTs 36 may each be a double walled tank. Further, each UST 36 may include a tank monitor (TM) 38 associated therewith. Tank monitors 38 may communicate with fuel dispensers 34 (either through site controller 26 or directly, as needed or desired) to determine amounts of fuel dispensed and compare fuel dispensed to current levels of fuel within USTs 36 to determine if USTs 36 are leaking.

Tank monitor 38 may communicate with site controller 26 and further may have an off-site communication link 40 for leak detection reporting, inventory reporting, or the like. Much like off-site communication link 28, off-site communication link 40 may be through the PSTN, the Internet, both, or the like. If off-site communication link 28 is present, off-site communication link 40 need not be present and vice versa, although both links may be present if needed or desired.

Further information on and examples of fuel dispensers and retail fueling environments are provided in U.S. Pat. No. 6,435,204 (entitled "Fuel Dispensing System"); U.S. Pat. No. 5,956,259 (entitled "Intelligent Fueling"); U.S. Pat. No. 5,734,851 (entitled "Multimedia Video/Graphics in Fuel Dispensers"); U.S. Pat. No. 6,052,629 (entitled "Internet Capable Browser Dispenser Architecture"); U.S. Pat. No. 5,689,071 (entitled "Wide Range, High Accuracy Flow Meter"); U.S. Pat. No. 6,935,191 (entitled "Fuel Dispenser Fuel Flow Meter Device, System and Method"); and U.S. Pat. No. 7,289,877 (entitled "Fuel Dispensing System for Cash Customers"), all of which are incorporated herein by reference in their entireties for all purposes. An exemplary tank monitor 38 may be the TLS-450 manufactured and sold by the Veeder-Root Company of Simsbury, Conn. For more information about tank monitors and their operation, reference is made to U.S. Pat. No. 5,423,457 (entitled "Real time tank product loss detection system"); U.S. Pat. No. 5,400,253 (entitled "Automated Statistical Inventory Reconciliation System for Convenience Stores and Auto/truck Service Stations"); U.S. Pat. No. 5,319,545 (entitled "System to Monitor Multiple Fuel Dispensers and Fuel Supply Tank"); and U.S. Pat. No. 4,977,528 (entitled "Apparatus and Method for Determining the Amount of Material in A Tank"), all of which are incorporated by reference herein in their entireties for all purposes.

Figure 2:
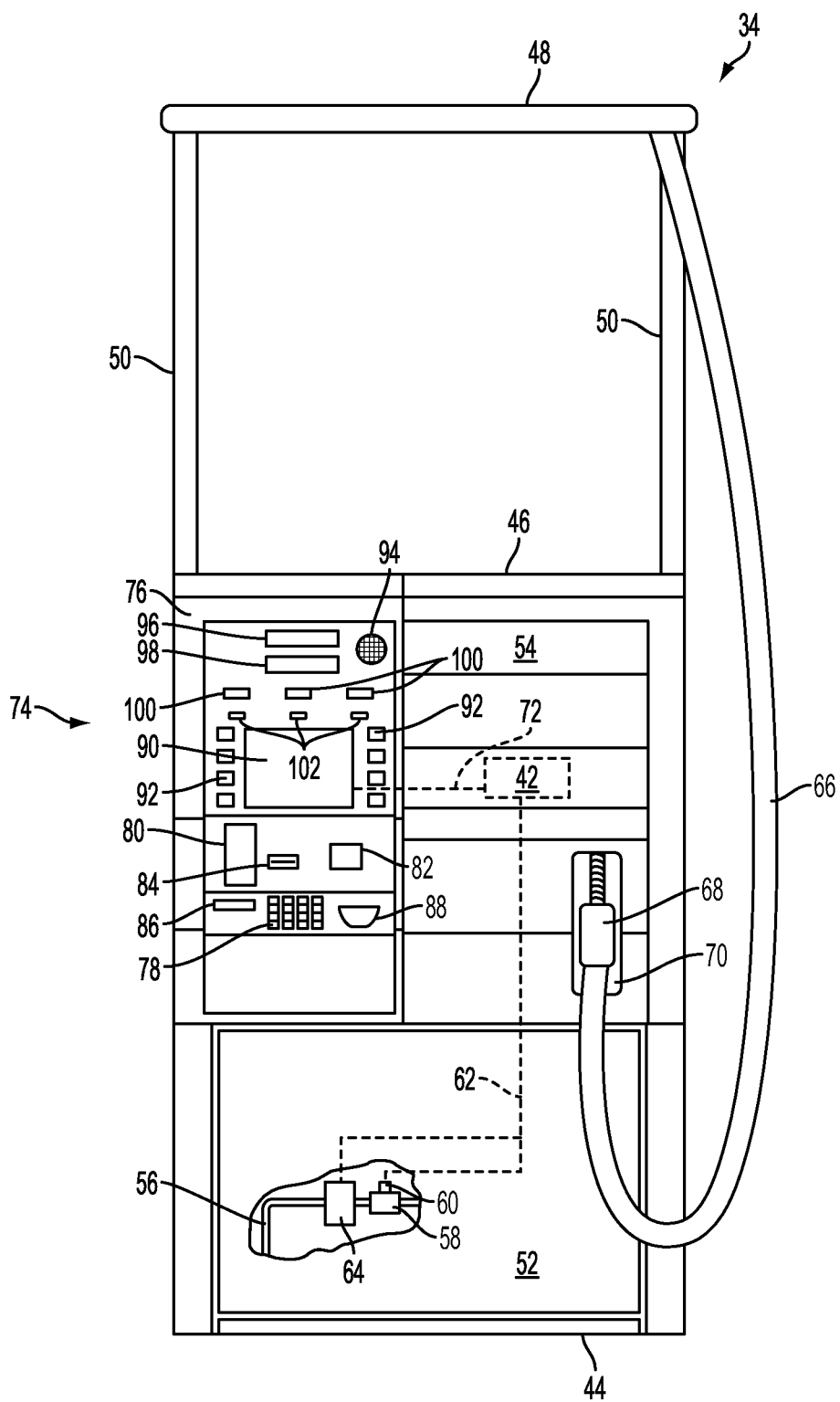
FIG. 2 is a front elevation of an exemplary fuel dispenser that may operate within the retail fueling environment of FIG. 1.

FIG. 2 illustrates a fuel dispenser 34 that may operate in association with site controller 26. Dispenser 34 includes a control system 42, which may be a processor, microprocessor, controller, microcontroller, or other suitable electronics with associated memory and software programs running thereon. In a preferred embodiment, control system 42 is comparable to the microprocessor-based control systems used in CRIND and TRIND type units sold by Gilbarco Inc. Control system 42 is in operative communication with site controller 26. Control system 42 further controls various aspects of the fuel dispenser 34 as described in more detail below.

The memory of control system 42 may be any suitable memory or computer-readable medium as long as it is capable of being accessed by the control system, including random access memory (RAM), read-only memory (ROM), erasable programmable ROM (EPROM), or electrically EPROM (EEPROM), CD-ROM, DVD, or other optical disk storage, solid-state drive (SSD), magnetic disc storage, including floppy or hard drives, any type of suitable non-volatile memories, such as secure digital (SD), flash memory, memory stick, or any other medium that may be used to carry or store computer program code in the form of computer-executable programs, instructions, or data. Control system 42 may also include a portion of memory accessible only to control system 42.

In the illustrated embodiment, dispenser 34 has a base 44 and a top 46, with a canopy 48 supported by two side panels 50. Fuel dispenser 34 is subdivided into multiple compartments. In this regard, a hydraulic area 52 encloses hydraulic components and an electronic area 54 encloses electronic components. A vapor barrier may be used to separate the hydraulic area 52 from the electronic area 54.

Several components used to control fuel flow may be housed within the hydraulic area 52. Fuel from USTs 36 is pumped through a piping network into inlet pipe 56. Fuel being dispensed passes though a meter 58, which is responsive to flow rate or volume. A displacement sensor 60 (e.g., a pulser) is employed to generate a signal in response to fuel flow though the meter 58. Signals indicative of the flow of fuel being dispensed are provided to control system 42 via control lines 62. Control/data lines 62 may provide control signaling to a valve 64 that may be opened and closed to permit or not permit dispensing of fuel.

Meter flow measurements from sensor 60 are collected by control system 42. Control system 42 also typically performs calculations such as cost associated with a fuel dispensing transaction. Additionally, control system 42 controls transactional processing at fuel dispenser 34 as will be described in more detail below.

As a dispensing transaction progresses, fuel is then delivered to a hose 66 and through a nozzle 68 into the customer's vehicle. Dispenser 34 includes a nozzle boot 70, which may be used to hold and retain nozzle 68 when not in use. Nozzle boot 70 may include a mechanical or electronic switch to indicate when nozzle 68 has been removed for a fuel dispensing request and when nozzle 68 has been replaced, signifying the end of a fueling transaction. A control line provides a signaling path from the electronic switch to control system 42. Control system 42 may use signaling received via the control line in order to make a determination as to when a transaction has been initiated or completed.

Control/data lines 72 provide electronic communication between control system 42 and a user interface 74. User interface 74 includes various combinations of subsystems to facilitate customer interaction with dispenser 34 and acceptance of payment for dispensed fuel. A bezel 76 acts as a lip around the various subsystems of interface 74. In most cases, bezel 76 is flush with the face of the fuel dispenser; however, in some embodiments it may extend outwardly from the face, in effect forming a raised lip. Bezel 76 may also comprise a plurality of sections that frame or house various subsystems or components.

As shown, user interface 74 includes several input devices with which embodiments of the present invention may be used. For example, user interface 74 may include a keypad 78. Keypad 78 is typically used for entry of a PIN if the customer is using a debit card for payment of fuel or other goods or services. In a preferred embodiment, keypad 78 may be the FlexPay™ encrypting PIN pad offered by Gilbarco Inc. User interface 74 may also include a secure card reader 80 for accepting credit, debit, or other chip or magnetic stripe cards for payment. Additionally, secure card reader 80 may accept loyalty or program-specific cards.

User interface 74 may also include other input devices such as a contactless card reader 82 (e.g., for integrated circuit or "smart" cards). Further, user interface 74 may include other payment or transactional devices such as a bill acceptor 84, a receipt printer 86, and a change delivery device 88. Receipt printer 86 may provide a customer with a receipt of the transaction carried out at fuel dispenser 34. Change delivery device 88 may deliver change to a customer for overpayment. Other input devices, such as an optical reader and a biometric reader, are also contemplated.

A display 90 may be used to display information, such as transaction-related prompts and advertising, to the customer. In some embodiments, a touch screen may be used for display 90. In this case, display 90 may be configured to display a virtual keypad for receiving payment data such as a PIN of a debit card or the billing zip code of a credit card, for instance. Display 90 may also be used to receive a selection from the customer regarding the displayed information.

The customer may use soft keys 92 to respond to information requests presented to the user via the display 90. An intercom 94 may be provided to generate audible cues for the customer and to allow the customer to interact with an attendant. In addition, dispenser 34 may include a transaction price total display 96 that presents the customer with the price for fuel that is dispensed. A transaction gallon total display 98 may be used to present the customer with the measurement of fuel dispensed in units of gallons or liters. Octane selection buttons 100 may be provided for the customer to select which grade of fuel is to be dispensed before dispensing is initiated. Finally, price per unit (PPU) displays 102 may be provided to show the price per unit of fuel dispensed in either gallons or liters, depending on the programming of dispenser 34.

Figure 3:
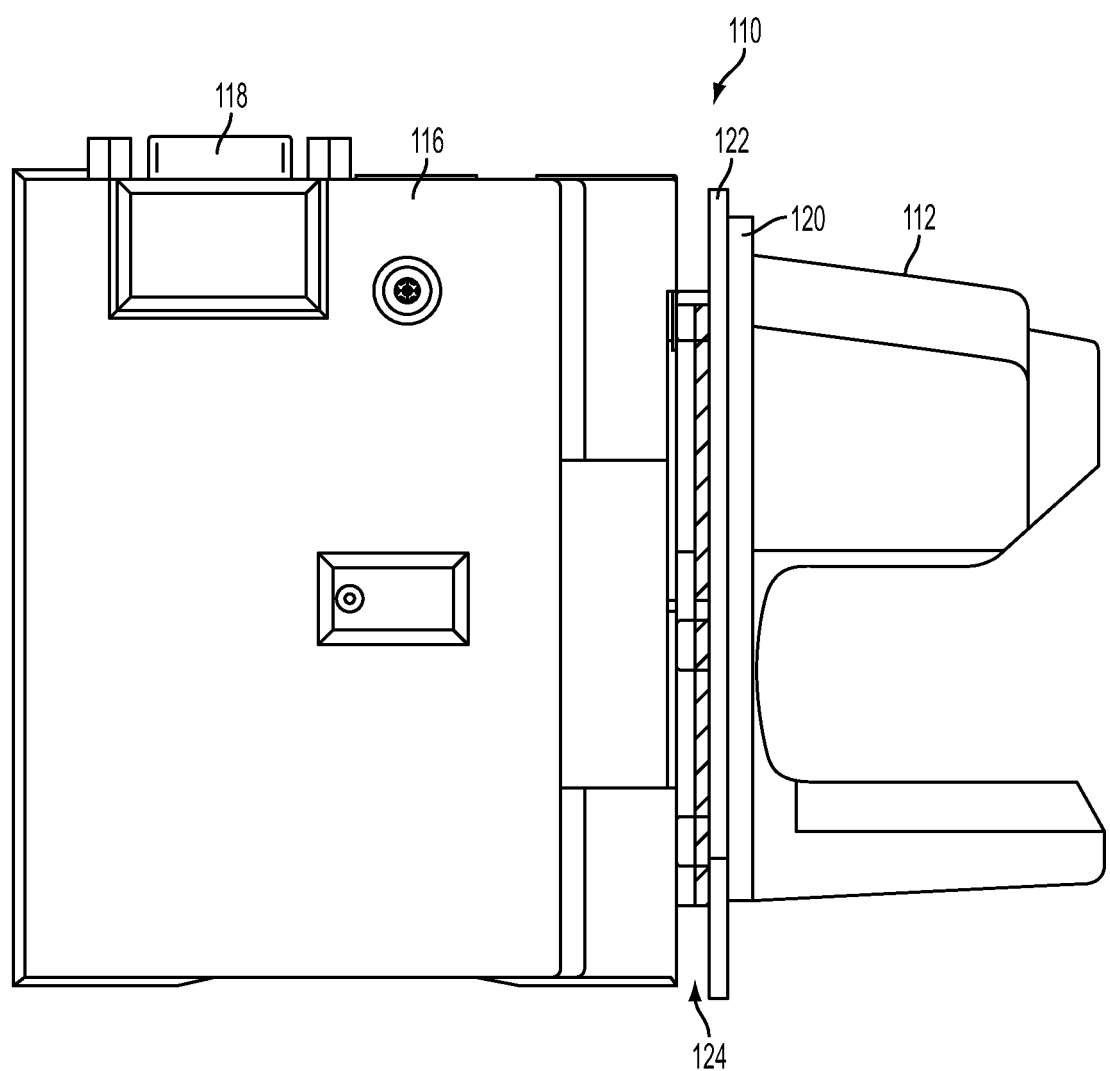
FIG. 3 is a side view of a secure card reader input device with which embodiments of the present invention may be used.
Figure 4:
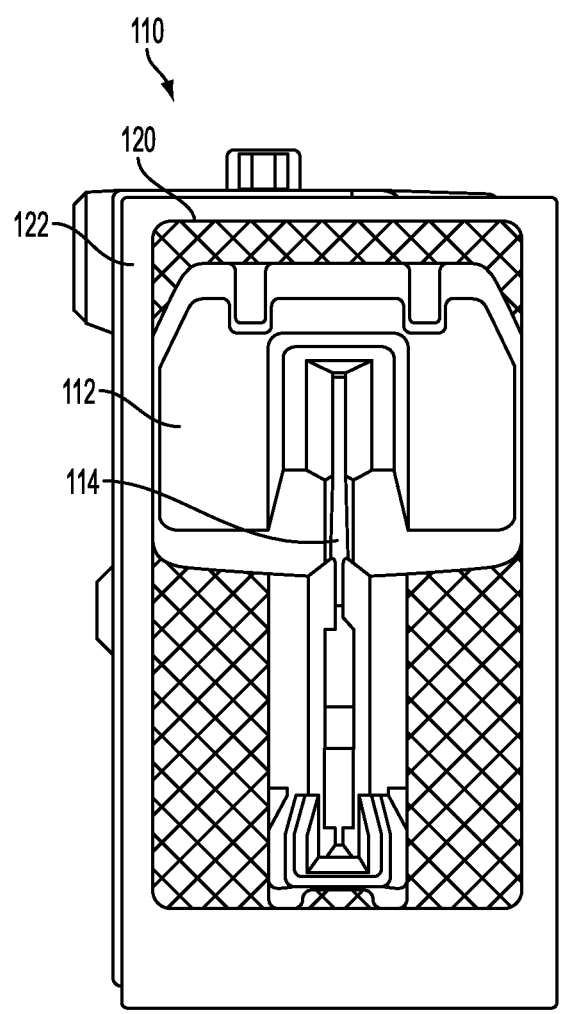
FIG. 4 is a front view of the input device of FIG. 3.

As noted above, embodiments of the invention relate to systems and methods for detecting skimming associated with one or more input devices. For example, some embodiments provide a system comprising a card reader which may be used for detecting skimming. In this regard, FIG. 3 is a side view of a secure card reader input device 110 with which embodiments of the present invention may be used, and FIG. 4 is a front view of secure card reader 110. Although some embodiments of the present invention are described below with reference to card reader 110, those of skill in the art will appreciate that the present invention may be used with any suitable input device, including manual or motorized card readers, keypads, PIN pads, touchscreens, or the like.

Card reader 110 may comprise a bezel 112 in which a dual-sided read head is disposed for receiving information from a payment card, such as a magnetic stripe or EMV card, which may be inserted into a read slot 114. Card reader 110 may further comprise a housing 116 containing control and sensing electronics (described in more detail below) and at least one input-output ("I/O") port 118 for receiving and loading data, such as encryption keys. In presently preferred embodiments, secure card reader 110 may be similar to the MagTek® PermaSeal secure card reader or the FlexPay™ secure card reader offered by Gilbarco Inc. Additional background regarding the operation and internal components of secure card readers is provided in U.S. Pub. App. No. 2013/0140364, entitled "Systems and Methods for Detecting and Preventing Tampering of Card Readers," the disclosure of which is incorporated by reference herein in its entirety for all purposes.

As will be appreciated, card reader 110 may be configured for mounting with a bezel of a fuel dispenser, such as bezel 76 described above. Thus, bezel 112 of card reader 110 may define a front face 120 and a flange 122 disposed behind front face 120. After mounting, front face 120 is flush with a front surface of the fuel dispenser bezel and flange 122 adjoins a rear surface of the fuel dispenser bezel. Because flange 122 defines a larger area than front face 120, flange 122 prevents removal of card reader 110 from the front of the fuel dispenser bezel and offers a measure of weather protection for the electronics in housing 116.

A bracket may preferably be used to secure card reader 110 to the fuel dispenser bezel, although other mounting methods are contemplated. As shown in FIG. 3, card reader 110 may preferably define a gap 124 about its periphery between housing 116 and flange 122. Gap 124 is sized to receive a thin, u-shaped bracket which may be removably attached to card reader 110 by friction-fit. The bracket may preferably have an area larger than that of flange 122 and define a plurality of apertures. The apertures may be sized to receive mounting screws or other fasteners. As the bracket is coupled to the fuel dispenser bezel, flange 122 is forced toward the rear surface of the fuel dispenser bezel to secure card reader 110 in place.

Figure 5:
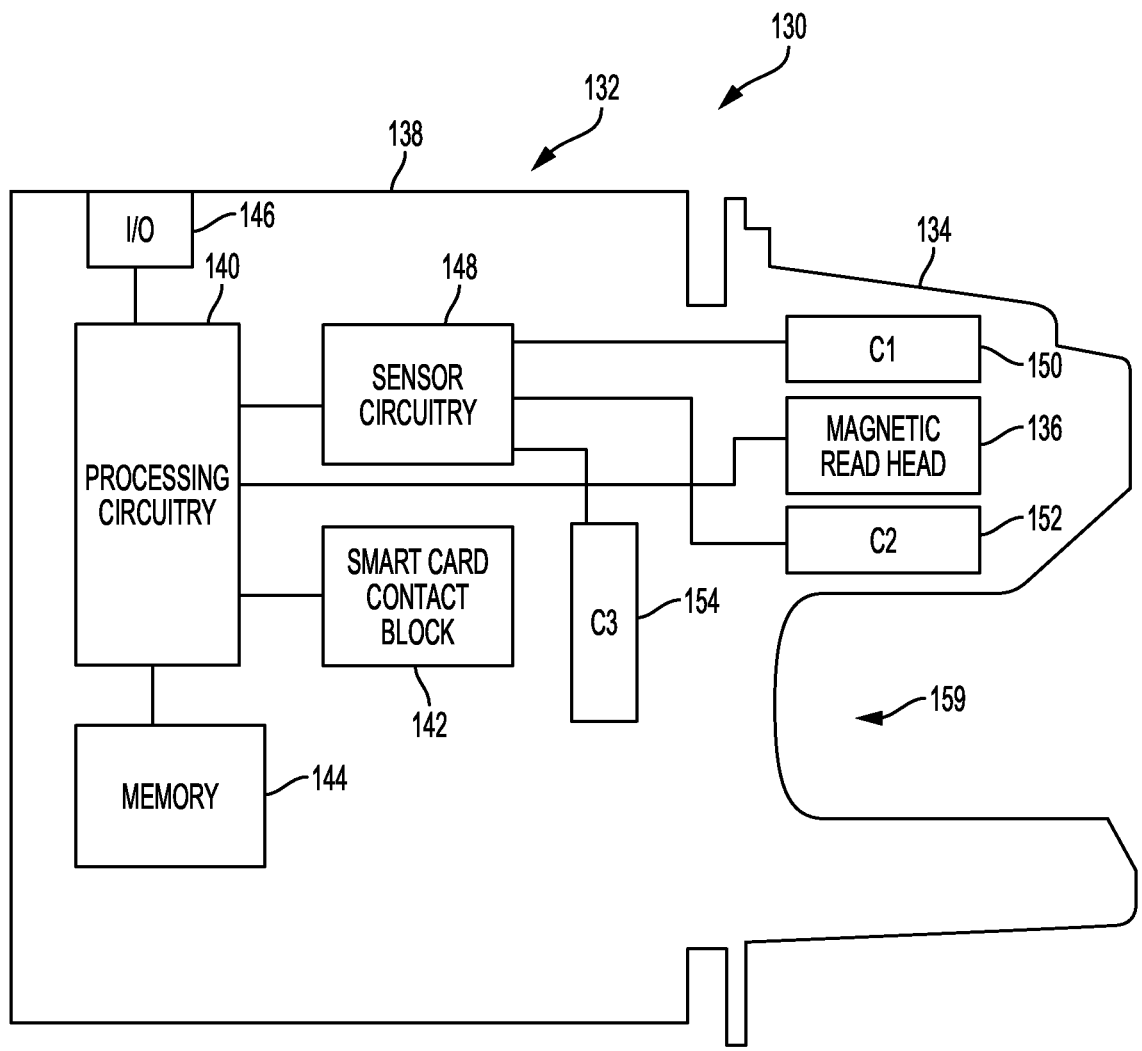
FIG. 5 is a schematic cross-sectional view of a system comprising a card reader input device constructed in accordance with one embodiment of the present invention.

FIG. 5 is a schematic cross-sectional view of a system 130 comprising a card reader input device 132 constructed in accordance with one embodiment of the present invention. Card reader input device 132 is preferably configured to extract information associated with a user from a payment card, such as a magnetic strip card, smart card, loyalty card, or the like. Input device 132 may preferably be similar in some respects to secure card reader 110, described above, and thus input device 132 may comprise a bezel 134 in which a magnetic read head 136, which may be dual-sided, is disposed and a housing 138 containing control and sensing electronics. The control and sensing electronics may comprise processing circuitry 140, a smart card contact block 142, a memory 144, and at least one I/O port 146. In some embodiments, as discussed in more detail below, the control and sensing electronics may comprise a sensor assembly including sensor circuitry 148 in electronic communication with a plurality of coils 150, 152, 154.

Processing circuitry 140 may be in electronic communication with magnetic read head 136, smart card contact block 142, memory 144, I/O port 146, and sensor circuitry 148. Processing circuitry 140 may carry out encryption, functional, and control processing for input device 132. In this regard, processing circuitry 140 may comprise one or more processors, microprocessors, programmable logic devices, or other processing components. Memory 144 may store one or more types of sensitive information, including encryption keys or customer account information. In addition or in alternative to memory 144, processing circuitry 140 may comprise one or more volatile or non-volatile memory components that store information accessible to processing circuitry 140.

As described in more detail below, processing circuitry 140 may comprise one or more secure processors programmed to compare information received from sensor circuitry 148 with reference information stored in memory 144 (or a remote location, such as a fuel dispenser control system, a site controller, a cloud server, or another remote computing device) to detect the presence of a skimming device or an attempted skimming fraud. Further, processing circuitry 140 may preferably be configured to take an appropriate action to prevent fraud if processing circuitry 140 detects a suspected skimming device or skimming fraud. For example, processing circuitry 140 may be configured, in the event of suspected fraud, to erase preselected information from memory, render itself and/or input device 132 partially or completely inoperable, and/or set a flag and send a message alerting appropriate personnel that input device 132 should be inspected.

In this embodiment, input device 132 may be both a magnetic strip card reader as well as a smart card reader, though this is not required in all embodiments. In this regard, magnetic read head 136 is configured to extract information from a magnetic strip on a user's card, such as a magnetic strip card, smart card, loyalty card, or the like. Such information may include a PAN, loyalty program number, or any other information commonly stored on tracks 1 or 2 of a magnetic strip payment card. Smart card contact block 142 is configured for establishing electrical contact with an IC embedded in a smart card or EMV card. Processing circuitry 140 preferably communicates with smart card contact block 142 to extract information from a smart card inserted in input device 132.

I/O port 146 may provide a physical communication interface through which signals indicative of information extracted from a card inserted in input device 132 may be communicated. As noted above, I/O port 146 may also be used for receiving and loading data, such as encryption keys. Those of skill in the art will appreciate that, in many cases, information extracted from a card associated with a user of input device 132 may be encrypted prior to transmission via I/O port 146. I/O port 146 is preferably in electronic communication with a remote payment host, as is well known. In addition, I/O port 146 may be in electronic communication with a variety of other remote devices, such as a fuel dispenser control system, a retail fueling environment POS, a site controller, a cloud server, or another remote computer or server. In one embodiment, input device 132 may be in electronic communication with one or more payment hosts via off-site communication link 28, described above.

In embodiments of the present invention, an input device may be configured to detect the presence of a skimming device in the vicinity of the input device or an attempted skimming fraud by detecting or measuring changes in electrical characteristics of a sensor or sensor circuit internal to or coupled with the exterior of the input device. For example, the unexpected presence of a conductive or magnetic material (such as the magnetic read head of a skimming device) placed in the vicinity of the sensor may cause a measurable change in certain electrical characteristics, such as inductance, capacitance, or impedance. A circuit of a skimming device placed in the vicinity of an input device may also influence electrical characteristics of the sensor. Aspects of the change in electrical characteristics, such as duration and amount, may then be compared with data comprising reference or expected levels stored in nonvolatile memory to make a determination regarding the likelihood that skimming is occurring. In some embodiments, this comparison is performed at the processing circuitry of the input device, but this is not required. In other embodiments, the comparison may be performed at a remote device or server, such as a fuel dispenser control system, a site controller, or a cloud computer.

In one preferred embodiment, the sensor may comprise one or more inductive sensor(s) to detect changes in inductance and/or losses, though in other embodiments, sensor(s) may be configured to detect changes in electrical characteristics other than inductance, for example including parallel impedance. Those of skill in the art are familiar with inductive sensors. In general, an inductive sensor may comprise a circuit having an oscillator configured to generate an AC current through a coil to generate an AC magnetic field. When a conductive material, such as a metal object, is brought into the vicinity of the coil, this magnetic field will induce eddy currents on the surface of the conductive material. The eddy currents are a function of the size and composition of the conductive material and its distance from the coil. The eddy currents generate their own magnetic field, which opposes the magnetic field generated at the coil. (In other words, the eddy currents can be thought of as the secondary core of a transformer, with the coil being the primary core of the transformer.) This adds dependent inductive and loss (i.e., resistive) components to the circuit which can then be measured. The inductance at the coil includes both the coil's inductance and the coupled inductance of the conductive material. Likewise, the coil has a resistance which includes both the parasitic series resistance of the coil and the parasitic resistance of the eddy currents.

Preferred embodiments of an inductive sensing approach may require the inductive sensor to be accurate and sensitive to small changes. Further, the inductive sensor(s) are preferably in operative electronic communication with sensor circuitry capable of measuring and monitoring changes in either or both of the inductance and losses, or resistance, as a result of conductive objects in the vicinity of the sensor. In the embodiment illustrated in FIG. 5, the sensor comprises coils 150, 152, and 154 integrated inside input device 132 and in electronic communication with sensor circuitry 148. Thus, the sensor is an integral part of the electronics of input device 132 and may use power provided to input device 132 for operation. The sensor cooperates with processing circuitry 148 to detect the attempts at skimming fraud. In some embodiments, it is contemplated that sensor circuitry 148 may be incorporated into or a part of processing circuitry 140.

More particularly, sensor circuitry 148 may preferably comprise electrical circuit components suitable for measuring inductance, losses, or other electrical characteristics at one or more sensing coils. Those of skill in the art can select suitable sensor circuitry 148 for this purpose. In a preferred embodiment, however, sensor circuitry 148 may comprise one or more application-specific integrated circuits for measuring inductance and/or losses, such as but not limited to the LDC1000, LDC1612, or LDC1614 inductance-to-digital converters offered by Texas Instruments, Inc. of Dallas, Tex. With 16, 24, or 28 bit resolution, the detection process may be capable of detecting and resolving very small changes in inductance and loss parameters.

In general, the number and placement of the sensing coil(s) will depend on the particular input device with which embodiments of the present invention are used and the type of skimming fraud anticipated. Further, the operating frequencies and/or timing considerations of the coil(s) may be set as a function of system requirements. In some cases, fewer or more than three coils may be provided, and the coil(s) may be disposed in locations other than those shown schematically in FIG. 5. In the illustrated embodiment, however, sensing coils 150, 152, and 154 are preferably disposed internal to input device 132 in locations which allow input device 132 to monitor for skimming fraud both with respect to magnetic read head 136 and with respect to smart card contact block 142.

More particularly, if a skimming device overlaid on input device 132 is configured to capture data from a magnetic strip on a user's card, the skimming device will have a reader component that is placed proximate magnetic read head 136 so that, when a user inserts the card, the overlaid device can capture the user's account information simultaneously with magnetic read head 136. Thus, coils 150 and 152 are preferably disposed in bezel 134 proximate magnetic read head 136 to increase the likelihood that an overlaid skimming device will be detected. Similarly, if a skimming device overlaid on input device 312 is configured to capture data from the IC embedded in a smart card, the skimming device will comprise a component that is placed proximate smart card contact block 142 in input device 132. Such a component may be, for example, an IC skimming chip that is plugged inside input device 132 to "sniff" the communication which occurs when a smart card is inserted. Therefore, coil 154 is preferably disposed in housing 138 proximate smart card contact block 142 to again increase the likelihood that the skimming device is detected. All three coils 150, 152, and 154 are preferably oriented to maximize their respective sensitivity to the presence of an unexpected conductive material along an axis which lies in the path of an inserted card.

Figure 6:
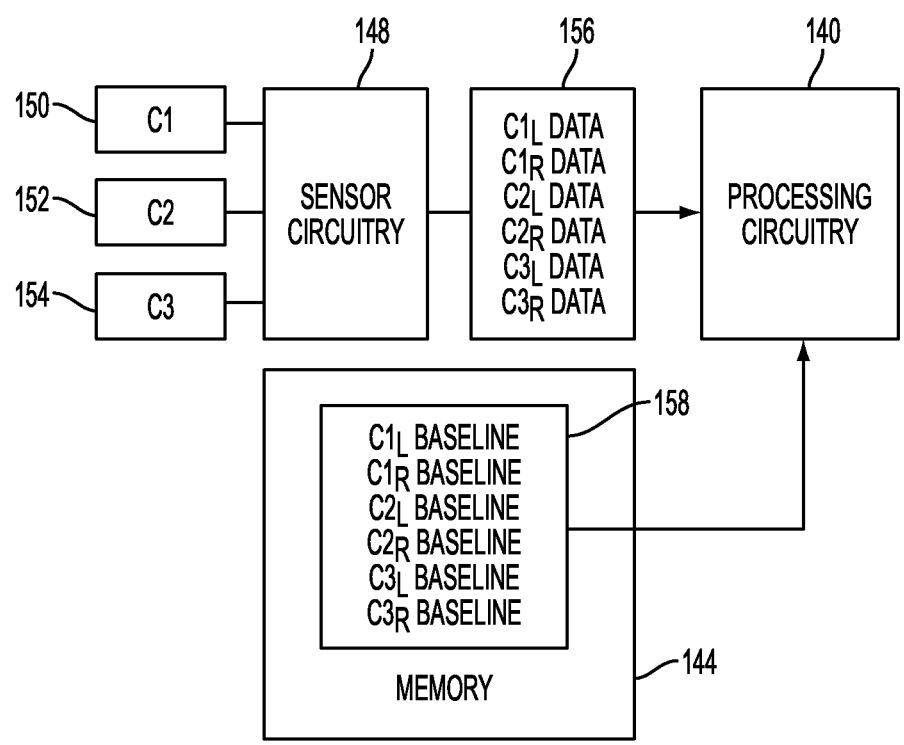
FIG. 6 is a block diagram of the control and sensing electronics of the system of FIG. 5 in accordance with an embodiment of the present invention.

Operation of input device 132 according to one embodiment of the present invention is described with reference to FIGS. 6 and 7. Turning first to FIG. 6, illustrated is a block diagram of the control and sensing electronics of system 130 shown in FIG. 5. More particularly, when it is desired that input device 132 monitor for skimming fraud, processing circuitry 140 may communicate with sensor circuitry 148 to obtain information about the inductance and/or losses measured at coils 150, 152, and 154. Sensor circuitry 148 may pass data 156 to processing circuitry 140. As shown in FIG. 6, data 156 may comprise inductance data from each coil ("$C1_L$ Data," "$C2_L$ Data," and "$C3_L$ Data") and/or losses data from each coil ("$C1_R$ Data," "$C2_R$ Data," and "$C3_R$ Data").

In one embodiment, input device 132 may continuously or periodically monitor for the presence of skimming fraud. In other embodiments, however, it may be desirable to perform monitoring only at the initiation of and/or during a transaction at input device 132. Thus, sensor circuitry 148 and sensors 150, 152, 154 may only be actuated (i.e., "woken up") when processing circuitry 140 detects that a card has been inserted in input device 132. In another embodiment, input device 132 may comprise a switch which triggers operation of sensor circuitry 148 and sensors 150, 152, 154 when a card is inserted in input device 132.

In any event, when processing circuitry 140 receives data 156, it may compare data 156 with data 158 which has previously been stored in memory 144. Data 158 may comprise "baseline," or reference, values of inductance and/or losses at each coil ("$C1_L$ Baseline," "$C2_L$ Baseline," "$C3_L$ Baseline," "$C1_R$ Baseline," "$C2_R$ Baseline," and "$C3_R$ Baseline"). More specifically, data 158 may be representative of the inductance and/or losses at each coil during intended use of input device 132 (i.e., in the absence of any foreign conductors). Further, in some embodiments, data 158 may also comprise values of inductance and/or losses at each coil which occur when a smart card containing a conductive IC is inserted in input device 132. Correspondingly, data 158 may contain information representative of the duration of changes in inductance and/or losses which correspond to a typical smart card transaction.

In some embodiments, the values which comprise data 158 may be calibrated, measured, and stored in memory 144 during manufacture of input device 148. In other embodiments, data 158 may be calibrated, measured, and/or stored during or after installation, such as at a terminal, fuel dispenser, POS, or the like. As noted above, memory 144 is preferably nonvolatile so that data 158 is not lost if input device 132 loses power. Also as noted above, in some embodiments data 158 may also or instead be stored in a remote device or server, such as a fuel dispenser control system, a site controller, or a cloud computer.

During the comparison of data 156 and data 158, processing circuitry 140 may determine whether the inductance and/or losses values of data 156 differ from the inductance and/or losses values of data 158 by a predetermined amount. If so, this may be indicative of skimming fraud by itself. In this regard, the predetermined amount may be determined during measurement and/or calibration of data 158. Further, the predetermined amount may differ in value depending on the location of a corresponding sensing coil. For example, the predetermined amount may be greater where a sensing coil is placed proximate smart card contact block 142, such as coil 154. Accordingly, for the data associated with this coil, the comparison may require that the difference between data 156 and data 158 be greater than the difference caused by an ordinary smart card transaction.

In some embodiments where at least a predetermined difference between data 156 and data 158 exists, however, processing circuitry 140 may also determine whether the difference is associated with a transaction at input device 132, such as a read of a user's card. In this regard, the insertion of a smart card with an embedded IC may cause data 156 to differ from the baseline. It will be appreciated that, in other embodiments used with input devices other than card readers, data 156 may still differ from the baseline values as a result of a transaction, such as where a conductive object on a user's hand or wrist is placed on or near a PIN pad. If the difference occurs in the absence of a transaction, this may also be evidence of skimming fraud. In still other embodiments, processing circuitry 140 may consider the length of time that data 156 differs from data 158 by more than a predetermined amount. If this time exceeds the time of a smart card transaction, or if data 156 never falls back below the predetermined level with respect to data 158, this may likewise be evidence that skimming fraud is being attempted. In other words, if input device 132 is idle, but there is a permanent detection of changes in inductance and/or losses, this may be evidence of skimming fraud. In some embodiments, all three of these methods may be used.

If processing circuitry 140 determines that fraud is occurring or is suspected, it may take any appropriate action to prevent fraud. For example, in one embodiment, processing circuitry 140 may set a flag and notify any device in electronic communication with input device 132 (such as, among others, a fuel dispenser control system, a site controller, a remote host, or a cloud server) that input device 132 needs to be inspected for the presence of a skimming device. Processing circuitry 140 can also signal an alarm in some embodiments. In other embodiments, processing circuitry 140 may disable itself and/or erase all information stored in memory 144 or elsewhere. In some embodiments, instead of erasing all information stored in memory, processing circuitry 140 may erase some information stored in memory but preserve information necessary to report that fraud is suspected. In yet other embodiments, processing circuitry 140 may cause input device 132 to lock itself mechanically to prevent further transactions.

In a further embodiment, one or more sensing coil(s) in communication with sensor circuitry 148 may be located proximate a mouth 159 of bezel 134 to detect whether a conductive material passes through mouth 159 and into housing 138 of input device 132. Although this configuration will detect the insertion of the IC embedded in a smart card, it will also detect the insertion of any other conductive device into input device 132. To discriminate between legitimate insertion of a smart card and illegitimate insertion of a skimming device or another conductive alien object, when a conductive object passes through mouth 159, processing circuitry 140 may also check whether a smart card was read at contact block 142. If not, processing circuitry 140 may then take appropriate action to prevent fraud. As discussed above, in some embodiments, processing circuitry 140 may also or alternatively compare data 156 for inductance and/or losses measured at coils 150, 152, and/or 154 to data 158, which may contain information representative of the inductance and/or losses at each coil during a "typical" smart card insertion and/or the duration of the change in inductance and/or losses during such an event.

Figure 7:
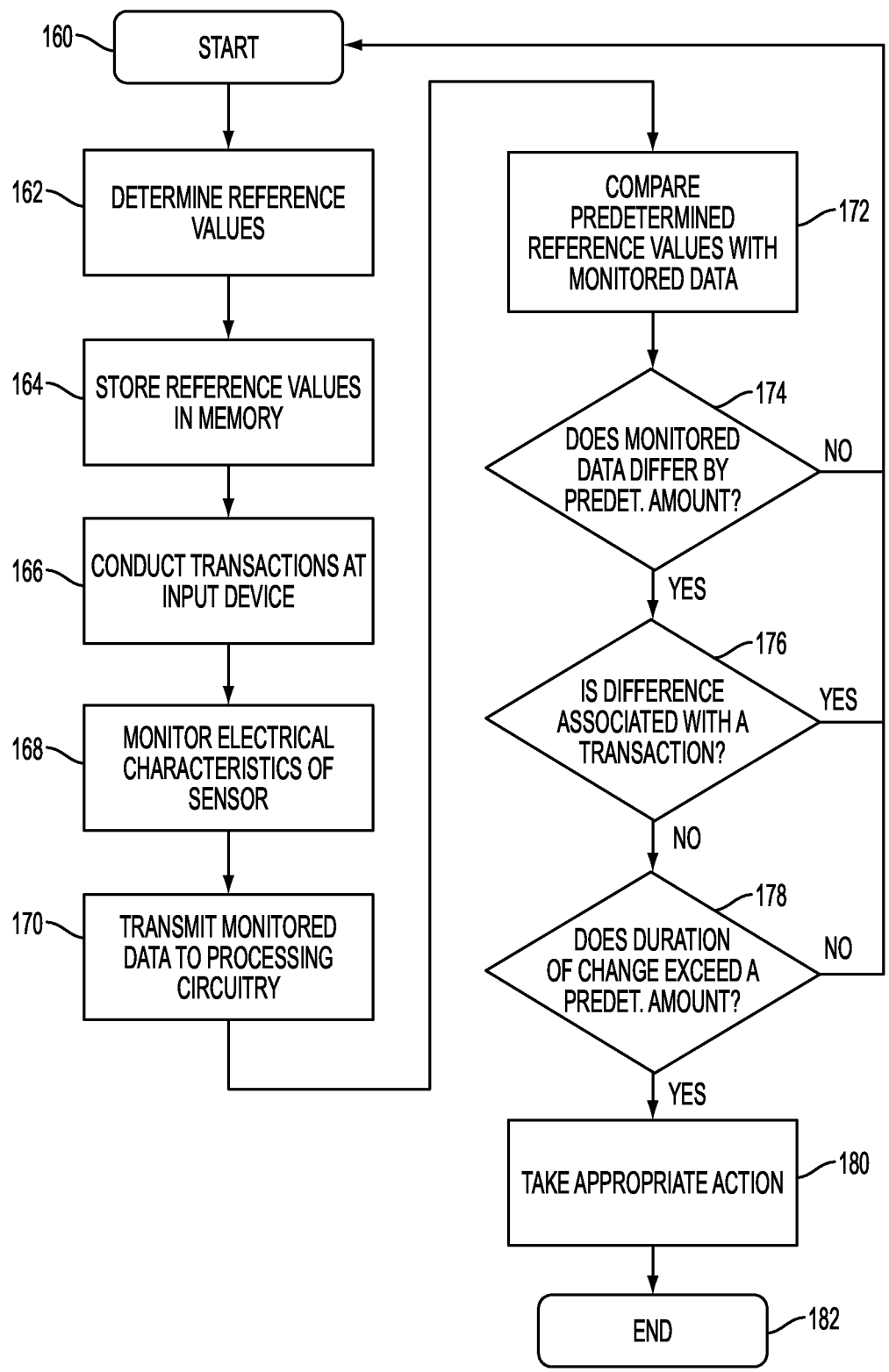
FIG. 7 is a flow chart illustrating steps of a method of detecting fraud caused by skimming according to an embodiment of the present invention.

FIG. 7 is a flow chart illustrating steps of a method of detecting fraud caused by skimming according to an embodiment of the present invention. The method starts (step 160), and reference values of inductance and/or losses for each sensor coil of an input device are determined as describe above (step 162). These reference values are then stored in a nonvolatile memory (step 164), which as noted above may be at the input device itself or located remotely therefrom. At step 166, transactions are conducted at the input device. Either continuously during operation of the input device or at least during each transaction, sensor circuitry of the input device may monitor changes in electrical characteristics, such as inductance and/or losses, at the sensor (step 168). At step 170, this data is transmitted to suitable processing circuitry, again either at the input device itself or at a remote device.

Next, the processing circuitry may compare the data received from the sensor circuitry to the reference values previously stored in memory (step 172). At step 174, the processing circuitry may determine whether the data received from the sensor circuitry differs from the reference values by at least a predetermined amount. If it does not, the method may start again at step 160. If it does, however, the processing circuitry may determine whether the detected difference is associated with a transaction at the input device, such as a card being read or a PIN being entered (step 176). If a transaction is ongoing, the method may again return to step 160. If a transaction is not occurring, however, the processing circuitry may evaluate the length of time that the data received from the sensor circuitry has differed from the reference value (step 178). If the duration does not exceed a predetermined duration, the method may return to step 160. If this duration instead does exceed a predetermined duration, such as the length of time it takes to complete a transaction, the processing circuitry may determine that skimming fraud is being attempted and take any action described above to stop or prevent the fraud (step 180). At step 182, the process ends.

Figure 8:
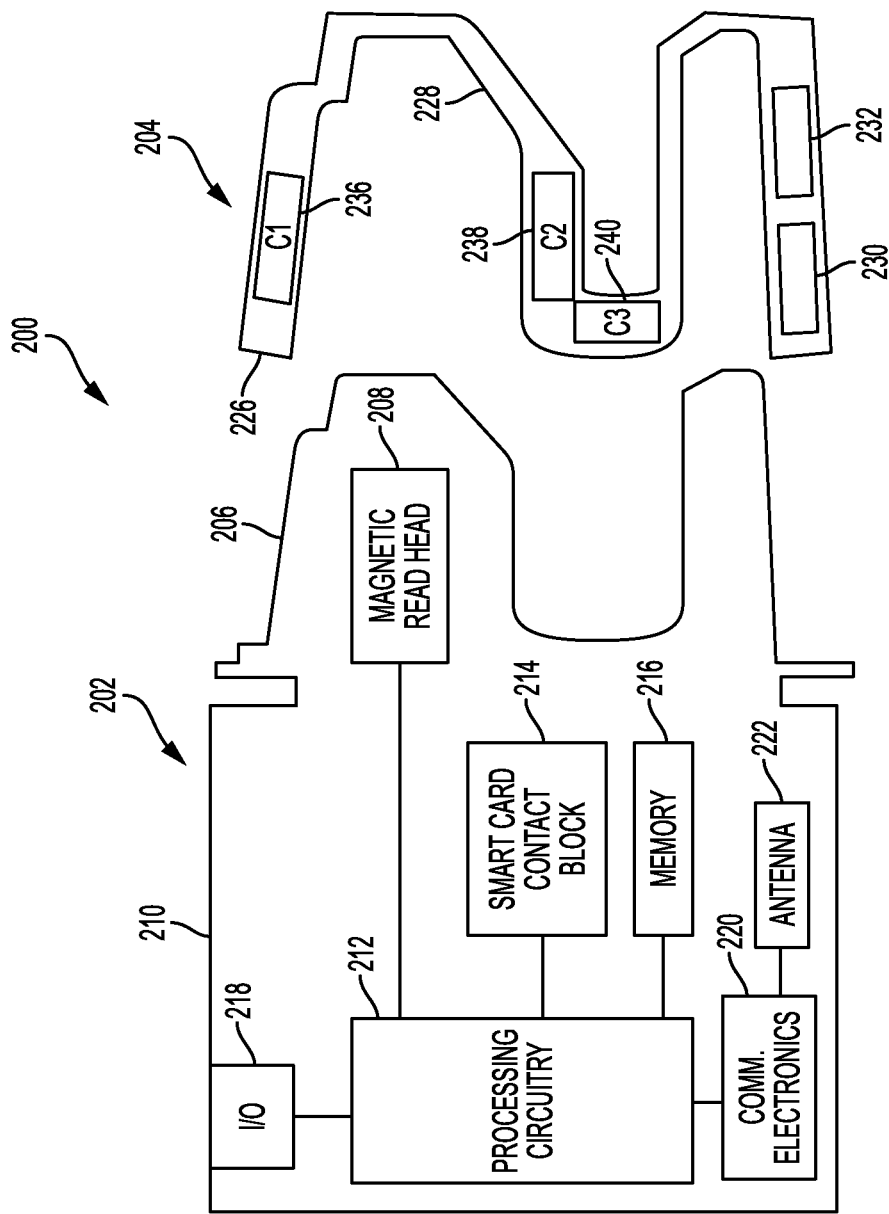
FIG. 8 is a schematic cross-sectional exploded view of a system comprising a card reader input device and an anti-skimming sensor module constructed in accordance with another embodiment of the present invention.
Figure 9:
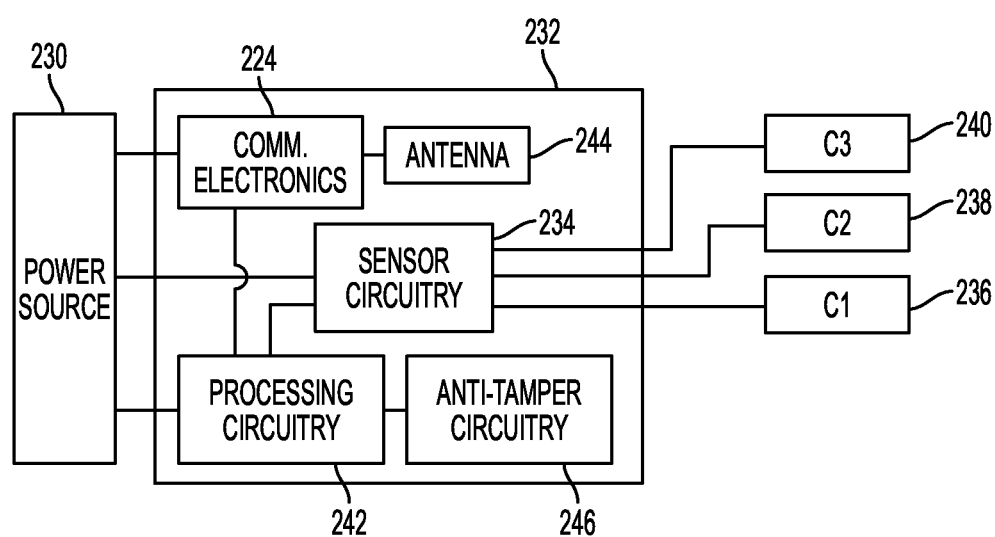
FIG. 9 is a block diagram of the control and sensing electronics of the sensor module of FIG. 8 in accordance with an embodiment of the present invention.

A system 200 according to another embodiment of the present invention is described with reference to FIGS. 8 and 9. In this regard, FIG. 8 is a schematic cross-sectional exploded view of system 200, which comprises a card reader input device 202 and an anti-skimming sensor module 204. As described below, anti-skimming sensor module 204 may be configured as a "retrofit" sensor assembly for existing input devices for which it is desired to detect and prevent skimming. FIG. 9 is a block diagram of the control and sensing electronics of sensor module 204.

Referring first to FIG. 8, input device 202 may be in some respects analogous to input device 132, described in detail above. In this regard, input device 202 may comprise a bezel 206 in which a magnetic read head 208 is disposed and a housing 210 containing control and sensing electronics. The control and sensing electronics may comprise processing circuitry 212, a smart card contact block 214, a memory 216, and at least one I/O port 218.

In contrast to input device 132 of system 130 described above, however, a sensor and sensor circuitry are not provided internal to input device 202. Rather, the control and sensing electronics of input device 202 may comprise wireless communications electronics 220 in electronic communication with one or more antennas 222. Communications electronics 220 and antenna 222 are preferably configured to wirelessly transmit data to and receive data from analogous communications electronics 224 (FIG. 9) disposed in sensor module 204 which is external to input device 202. The wireless communications are preferably conducted pursuant to a suitable wireless communications standard, such as the radio frequency communications standards IEEE 802.11, IEEE 802.15.4, ANT, UWB, Bluetooth, ZigBee, and Wireless USB, HSPA+, and LTE, among many others. Those of skill in the art are familiar with and can select suitable communications electronics 220, 224. In some embodiments, communications electronics 220 and antenna 222 may alternatively be disposed within the structure (e.g., an ATM, a counter, a terminal, SPOT, fuel dispenser, etc.) to which input device 202 is coupled and in electronic communication with processing circuitry 212. This may be the case, for example, where an existing input device does not include communications electronics 220 and antenna 222.

Sensor module 204 is preferably configured for coupling with an exterior of an existing input device. Accordingly, it will be appreciated that the shape of sensor module 204 may depend on the particular input device with which it is used. In this embodiment, sensor module 204 may preferably define a housing 226 configured to encapsulate bezel 206 of input device 202. As shown in schematic cross-section in FIG. 8, housing 226 may resemble the existing bezel 206 of input device 202 and have a back surface 228 which generally follows the contour of bezel 206. Indeed, in some embodiments, it is contemplated that housing 226 may define a shape analogous to that of a skimming device designed to be overlaid on bezel 206 of input device 202. In certain embodiments, however, sensor module 204 may be configured to be conspicuous in both form and function so that it is recognizable to users as anti-skimming technology. This may also discourage attempts at skimming fraud.

In any event, sensor module 204 may comprise a power source 230 in electrical communication with communications and sensing electronics 232. Notably, sensor module 204 may preferably comprise a sensor and circuitry analogous to the sensor circuit described above with reference to FIGS. 5-7. Thus, and referring also now to FIG. 9, communications and sensing electronics 232 may comprise sensor circuitry 234 in electronic communication with a plurality of sensor coils 236, 238, 240. Sensor circuitry 234 may be in electronic communication with processing circuitry 242. Processing circuitry 242, which may carry out encryption, functional, and control processing for sensor module 204 and which may comprise one or more processors, microprocessors, programmable logic devices, or other processing components, is also preferably in electronic communication with communications electronics 224 (which may have one or more associated antennas 244).

In some embodiments, communications and sensing electronics 232 may also comprise anti-tamper circuitry 246 in electronic communication with processing circuitry 242. Anti-tamper circuitry 246 may be analogous to the secure area, described above, or it may also comprise an anti-tampering IC or chip. In some embodiments, the anti-tamper circuitry 246 may comprise one or more accelerometers and be configured to monitor for dismounting events. In other embodiments, anti-tamper circuitry 246 may comprise a microswitch which may be actuated when sensor module 204 is coupled with input device 202. In any event, anti-tamper circuitry may be configured to alert processing circuitry 242 when sensor module 204 has been removed from input device 202. It is noted that, in other embodiments, anti-tamper circuitry 246 may be incorporated in or a part of processing circuitry 242.

Those of skill in the art should be familiar with suitable anti-tamper circuitry 246. In one embodiment, however, anti-tamper circuitry 246 may comprise a chip analogous to the USIP line of chips offered by Maxim Integrated Products. For example, in the event of tampering such a chip may erase information stored therein, rendering sensor module 204 nonfunctional. In another example, the software or application controlling sensor circuitry 234 and sensor coils 236, 238, 240 may be stored in a USIP chip. In a further embodiment, anti-tamper circuitry 246 may detect dismount via a hall-effect sensor operative to detect a change in magnetic field strength of a suitably-placed magnet. The change in magnetic field strength caused by the dismount may then be communicated to processing circuitry 242.

Power source 230 may be any source of power known to those of skill in the art and suitable for powering sensor module 204. In some embodiments, power source 230 may be a battery, and housing 226 of sensor module 204 may define extra space to provide room for a battery capable of operating for at least several years. Preferably, the electrical and electronic components of sensor module 204 may utilize low current and low duty cycle techniques to increase the suitability of battery-powered operation.

In other embodiments, however, power source 230 may power sensor module 204 via magnetic coupling. In one example, power source 230 may comprise a secondary coil of a transformer, with the primary coil being disposed on or within the structure to which input device 202 is coupled. The primary and secondary coils are preferably configured for magnetic coupling, and the energy transferred may be stored in a variety of ways. For example, power source 230 may comprise replaceable or rechargeable batteries, or one or more capacitors or supercapacitors. In embodiments where input device 202 is used in a fuel dispenser, this approach may provide an additional benefit of providing voltage isolation from fuel dispenser wiring in accordance with applicable certification standards, such as the Underwriters Laboratories (UL) standards. This approach may also facilitate long-term operation of sensor module 204 for a permanent installation. Additional background regarding magnetic coupling is provided in commonly-assigned U.S. Pat. No. 6,571,151, the disclosure of which is incorporated by reference herein in its entirety for all purposes.

As best seen schematically in FIG. 8, sensor coils 236, 238, and 240 are preferably disposed internal to housing 226 in locations which, when sensor module 204 is coupled with bezel 206, place them proximate areas of input device 202 at which a skimming device is most likely to be placed. In particular, sensor coils 236 and 238 may be located in housing 226 such that they are disposed above and below magnetic read head 208 when sensor module 204 is coupled with bezel 206. Likewise, sensor coil 240 may be located in housing 226 such that it is disposed near smart card contact block 214 when sensor module 204 is coupled with bezel 206. As with the shape of housing 226, however, the placement of sensor coils 236, 238, 240 in housing 226 will depend on the type of input device with which embodiments of sensor module 204 is used.

The operation of system 200 may be in many respects similar to the operation of system 130, described in detail above, with certain exceptions as noted below. As with system 130, the sensor or sensor assembly of input device 202 may continuously or periodically monitor for the presence of skimming fraud. For example, where input device 202 is configured to perform transactions with only magnetic strip cards, the sensor or sensor assembly may periodically monitor for the presence of skimming fraud. Further, where input device 202 is configured to perform transactions with both magnetic strip cards and smart cards, the sensor or sensor assembly may only monitor for the presence of skimming fraud when the initiation of a transaction is detected, as described above.

In any event, when it is desired that input device 202 monitor for skimming fraud, processing circuitry 242 of sensor module 204 may communicate with sensor circuitry 234 to obtain information about the inductance and/or losses measured at coils 236, 238, and 240. In this regard, sensor circuitry 234 may pass to processing circuitry 242 data analogous to data 156, described above. In some embodiments, sensor module 204 may comprise a memory in which reference data is stored, and processing circuitry 242 may itself perform comparisons analogous to those described above to detect skimming fraud. In a preferred embodiment, however, when processing circuitry 242 receives the data, it may cause the data to be transferred to processing circuitry 212 of input device 202 via communications electronics 224. Communications electronics 224 may wirelessly transmit the data to communications electronics 220 in input device 202, at which point the data may be passed to processing circuitry 212.

When processing circuitry 212 receives the data from sensor circuitry 234, it may compare this data with reference data previously stored in memory 216. The reference data may preferably be analogous to data 158, described in detail above, and processing circuitry 212 may perform any or all of the comparisons explained previously to detect skimming fraud. Also as noted above, in some embodiments, the reference data may also or instead be stored in a remote device or server, such as a fuel dispenser control system, a site controller, or a cloud computer, and in other embodiments, the comparison may be performed at such a remote device or server.

If skimming fraud is occurring or is suspected, processing circuitry 212 may take appropriate action to prevent fraud as described above. Further, in some embodiments, processing circuitry 242 of sensor module 204 may take appropriate action to prevent fraud. For example, processing circuitry 242 may cause communications electronics 224 to communicate, via communications electronics 220, with local and remote devices and/or computers, such as input device 202, a fuel dispenser control system, a cloud computer, and/or a payment host. Thereby, processing circuitry 242 may alert appropriate personnel that fraud is occurring or suspected, or it may cause input device 202 to be locked or disabled, such as by sending a signal to a fuel dispenser control system or a POS. Further, in some embodiments, the sensor module 204 may also lock or disable itself mechanically or electronically.

In embodiments where anti-tamper circuitry 246 is provided, processing circuitry 242 of sensor module 204 may communicate with anti-tamper circuitry 246 to determine whether tampering has occurred. If tampering is indicated, such as an attempt to disable input device 202 or to move or remove input device 202 or sensor module 204, processing circuitry 242 may send a signal to processing circuitry 212 of input device 202, and/or to a remote device, via communications electronics 224. Again, any appropriate action may be taken to prevent fraud.

Based on the above, it will be appreciated that embodiments of the invention provide systems and methods for detecting skimming associated with one or more input devices. While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A system for detecting fraud, said system comprising:
   a card reader input device comprising a first housing, wherein first processing circuitry, first wireless communications electronics, and at least one of a magnetic read head or a smart card contact block are disposed within the first housing;
   a sensor module removably coupled with an exterior surface of the card reader input device, the sensor module comprising a second housing, the second housing comprising a memory;
   at least one inductive sensor, a power source, second wireless communications electronics, and second processing circuitry disposed within the second housing;
   wherein the second processing circuitry is in electronic communication with the first processing circuitry via the first and second wireless communications electronics; and
   the memory in the second housing storing information representative of a threshold value of at least one of inductance or losses and computer executable instructions that, when executed by the second processing circuitry, cause the second processing circuitry to perform the steps of:
      actuating the at least one inductive sensor obtaining sensor data, the sensor data comprising at least one of inductance or losses;
      comparing the sensor data with the information representative of the threshold value stored in the memory; and
      transmitting, using the second wireless communications electronics, a wireless signal to the first wireless communications electronics of the card reader input device.

2. The system of claim 1, wherein the power source comprises a first transformer coil disposed in said second housing, and wherein the first transformer coil is magnetically coupled with a second transformer coil disposed in said first housing.

3. The system of claim 1, wherein said at least one inductive sensor comprises at least one coil.

4. The system of claim 1, further comprising sensor circuitry in electronic communication with said second processing circuitry and with said at least one inductive sensor.

5. The system of claim 4, wherein said sensor circuitry is an application-specific integrated circuit.

6. The system of claim 1, wherein the card reader input device is attached to a structure, and wherein wireless communications electronics are disposed in the structure.

7. The system of claim 1, wherein the second housing encapsulates a bezel of the card reader input device.

8. The system of claim 1, wherein the power source comprises a battery.

9. The system of claim 1, wherein the at least one inductive sensor comprises an inductance to digital converter.

* * * * *

UNITED STATES PATENT AND TRADEMARK OFFICE
CERTIFICATE OF CORRECTION

PATENT NO. : 11,695,448 B2
APPLICATION NO. : 14/813546
DATED : July 4, 2023
INVENTOR(S) : Myers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 660 days.

Signed and Sealed this
Twelfth Day of November, 2024

Katherine Kelly Vidal
*Director of the United States Patent and Trademark Office*